No. 667,483. Patented Feb. 5, 1901.
W. K. ALSBURY.
CULTIVATOR.
(Application filed Aug. 21, 1900.)
(No Model.)
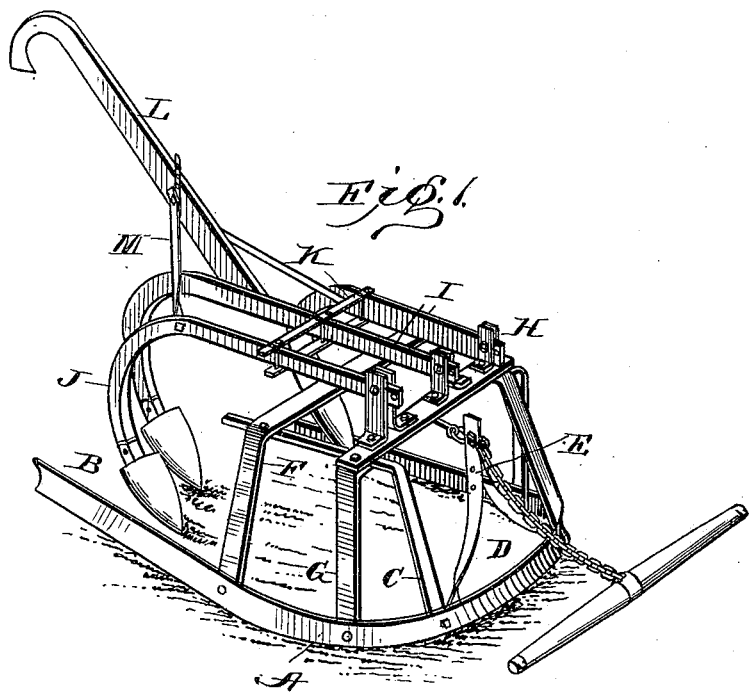
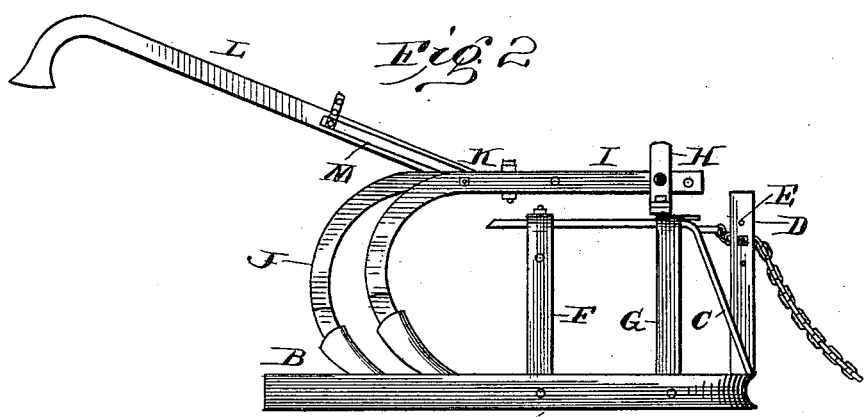
Witnesses:
J. M. Fowler Jr.
G. L. Dunn
Inventor
William K. Alsbury
By Farrell, Fowler & Farrell
Attys.

UNITED STATES PATENT OFFICE.

WILLIAM K. ALSBURY, OF HIAWATHA, NEBRASKA.

CULTIVATOR.

SPECIFICATION forming part of Letters Patent No. 667,483, dated February 5, 1901.

Application filed August 21, 1900. Serial No. 27,530. (No model.)

*To all whom it may concern:*

Be it known that I, WILLIAM K. ALSBURY, a citizen of the United States of America, residing at Hiawatha, in the county of Dundy and State of Nebraska, have invented certain new and useful Improvements in Cultivators, of which the following is a specification.

This invention relates to cultivators; and it has for its object to provide such an implement which will not only cultivate the ground, but will clean the weeds and grasses therefrom and throw or turn the soil to the plants.

With these objects in view and such others as may hereinafter appear my invention consists in the particular construction of the various parts and in the novel manner of combination and arrangement of said parts, all of which will be fully described, and specifically pointed out in the appended claims.

In the drawings forming a part of this specification, Figure 1 is a perspective view of my improved cultivator complete. Fig. 2 is a side elevation of the same.

Referring by letters to the drawings, A represents a steel band, which is concaved and curved or bent at its center to form a U, with its free ends flaring rearwardly, as shown at B. The object of the concaved band is to provide the implement with a cutting edge, and the general shape of the band is such as to cast the weeds and grasses cut to the respective sides of the cultivator.

Bolted or otherwise secured to the bent or curved portion of the band A are corresponding angle-irons C, between which are mounted suitable standards D, having a series of corresponding apertures E, adapted to receive a singletree to which a horse may be attached.

Mounted upon the parallel sides of the U-shaped band are similar braces F and G, the free ends of which are bolted to the opposite sides of the U. These braces are further supported by the angle-irons C, which are bolted thereto.

Pivoted upon the brace G in suitable supports H are three longitudinal bars I, the free ends of which are curved, as shown at J, and adapted to carry a shovel. These bars are secured together by a brace K, and the central bar, which is somewhat longer than the others, is provided with a handle L, braced to the outer bars by the rods M, as clearly shown in Fig. 1.

It will thus be seen that I provide a cultivator which is exceedingly cheap and simple in its construction and one that will efficiently perform all of its intended functions.

Having thus described the various features of my invention, what I claim as new, and desire to secure by Letters Patent, is—

1. In a cultivator, a semicircular band having its outer surface concaved and its free ends flaring rearwardly, in combination with a frame braced upon the band, a series of longitudinal bars braced together and provided with a handle, the said bars being pivoted upon the frame and having their free ends curved downwardly, and adapted to support a shovel, substantially as shown and described.

2. In a cultivator, a semicircular band having its outer surface concaved and its free ends flaring rearwardly, in combination with a frame mounted upon the band, the said frame supporting a series of longitudinal bars, which are pivoted thereto, and provided with suitable braces and a handle, the bars terminating in a curve and adapted to support a shovel, substantially as shown and described.

In testimony whereof I affix my signature in the presence of two witnesses.

WILLIAM K. ALSBURY.

Witnesses:
J. J. ELLISON,
W. P. HARDWICK.